July 25, 1950  M. ROKACH  2,516,593
COMMUTATOR FOR ROTARY DYNAMOELECTRIC MACHINES
Filed Dec. 18, 1947
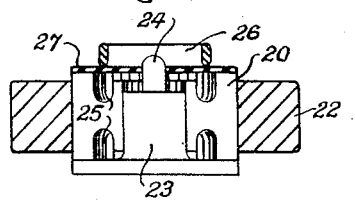
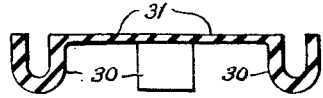
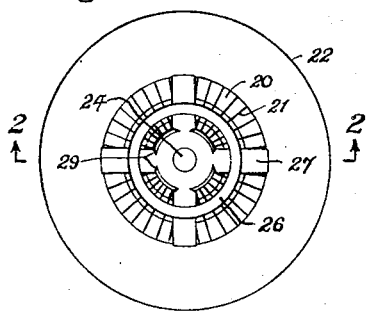
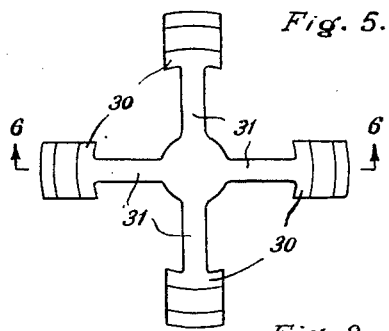
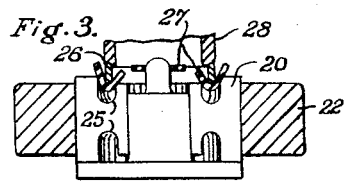
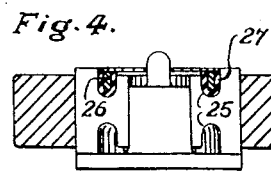
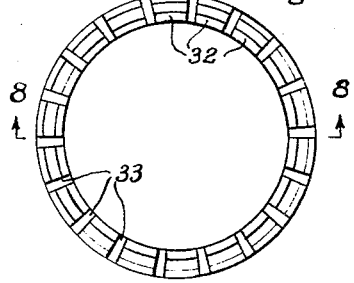
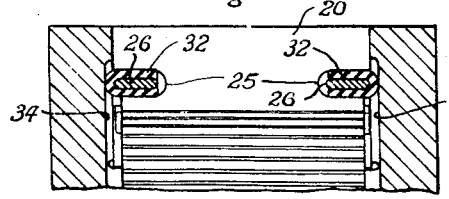
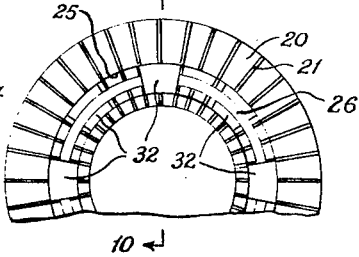
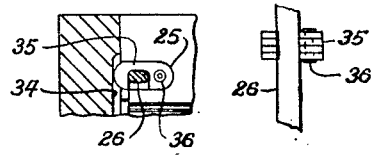
INVENTOR
MAX ROKACH
By Otto Munk
HIS ATTY Patented July 25, 1950

2,516,593

UNITED STATES PATENT OFFICE 2,516,593

COMMUTATOR FOR ROTARY DYNAMO-ELECTRIC MACHINES

Max Rokach, Gerrards Cross, England, assignor to Watliff Company Limited, London, England, a company of Great Britain Application December 18, 1947, Serial No. 792,439
In Great Britain June 18, 1945

Section 1, Public Law 690, August 8, 1946
Patent expires June 18, 1965

9 Claims. (Cl. 171—320)

This invention relates to commutators for rotary dynamo-electric machines, and of the kind in which the conducting segments are set in a basic body consisting of a moulded mass of synthetic resin or like electrically insulating mouldable material, the assembled ring of segments being formed at each end with an annular recess accommodating a metal reinforcing ring which is electrically insulated from the segments and buried in the said basic body.

Objects of this invention are to provide improved methods of manufacturing commutators of this kind and commutators manufactured by the improved method.

Another object is to simplify the locating of the said reinforcing rings concentrically in the said annular recesses after the conducting segments have been assembled into a ring.

Another object is to facilitate manufacture and handling of ring locating spacers adapted to be inserted in the same recess.

Another object is to provide location of the rings in both the radial and the axial directions during the final moulding of the basic body.

Various methods of carrying out the invention will be described with reference to the accompanying diagrammatic drawings, in which:

Fig. 1 is a plan of a small commutator during manufacture,

Fig. 2 is a section on the line 2—2 in Fig. 1,

Figs. 3 and 4 are sections corresponding to Fig. 2, but showing subsequent stages in manufacture, Fig. 5 is a plan of a set of spacers for a larger commutator, Fig. 6 is a section on the line 6—6 in Fig. 5, Fig. 7 is a plan of a group of spacers for large commutators, Fig. 8 is a section on the line 8—8 in Fig. 7, Fig. 9 is an end elevation of a large commutator in course of manufacture, Fig. 10 is a section of this commutator, taken on the line 10—10 in Fig. 9, in place in a mould, Fig. 11 is a section corresponding to a part of Fig. 10, and showing an alternative design of spacer, and Fig. 12 is a developed view of part of the reinforcing ring and a spacer, as viewed radially outwards in Fig. 11.

In Figs. 1 and 2, a ring of commutator segments 20 alternating with mica separators 21 is shown assembled in a jig 22. A plug 23 is fitted within the assembly and its upper end is provided with a central pin 24. The aforesaid annular recesses are denoted by 25. The spacers for the reinforcing ring 26 are made from the arms of a spider 27 stamped from pliable sheet insulating material. The hub of this spider has a central hole fitting over the pin 24, whereby the arms of the spider are located truly radially and at uniform intervals around the upper recess 25.

When downward pressure is applied to the reinforcing ring 26, e. g. by a press tool 28 as shown in Fig. 3, the arms of the spider are caused to fold around the descending ring 26, and part from the hub of the spider, this separation being assisted by nicks 29 forming a local weakening at the junction of each of the arms with the hub. The thickness of the spider is such that the arms wedge the reinforcing ring tightly in the recess 25, as indicated in Fig. 4, when this ring is pressed fully home.

Both ends of the assembly having been treated in the manner described, the rings are finally locked in place by plastic material moulded onto the segments in known manner, the circumferential gaps between the spacers leaving ample room for the free flow of moulding material into the recesses 25.

For commutators of larger size, e. g. ranging from 2 to 4 in. in diameter, the spacers can be preformed mouldings shaped to fit the recesses and the reinforcing ring. A complete set of such spacers is conveniently formed as a unit so as to facilitate production, assembly and location. Thus, as shown in Figs. 5 and 6, the spacers 30 are connected by arms 31 which are thin enough to be easily broken away after the spacers and the reinforcing ring have been fitted in the annular recess in the commutator.

For still larger commutators the spacers are of such a size that they are convenient for handling and assembly into the commutator as individual pieces. Nevertheless their fabrication may be facilitated by moulding them in a plastic insulating material, such as phenol-formaldehyde resin, in groups. An example of such group is shown in Figs. 7 and 8, where the moulding is a ring of spacers 32 connected by relatively fragile portions 33. Such spacers are easily broken apart after moulding, and any desired number can be incorporated in a commutator.

An advantage of this invention is that it enables the reinforcing rings to be positively located in the axial direction during the moulding of the assembled commutator. One method of securing axial location is illustrated by Figs. 9 and 10, where the assembly of segments 20 and separators 21 is held together by reinforcing rings 26 located in the recesses 25 by two sets of U-section spacers 32, one disposed with their channels directed axially outwards and the other with their channels directed axially inwards. The mould end faces 34 contact the latter spacers when the mould is closed, so that each reinforcing ring is positively locked between the two sets of spacers and thus cannot move axially under the flow pressure of the moulding material. The jig ring that surrounds the segments is omitted from Figs. 9 and 10.

An alternative construction which achieves the same object is shown in Figs. 11 and 12, where the spacers 35 are so channelled as to fit over the radially outer side of the reinforcing ring 26 and to embrace each end of the section of this ring. The end faces 34 of the mould engage the ends of the spacers 35 and thereby positively locate the rings in an axial direction in the recesses 25. The spacers 35 are assembled from laminae stamped out of sheet insulating material and held together by a rivet 36.

I claim:

1. A commutator for a rotary dynamo-electric machine, and of the kind in which the conducting segments are set in a basic body comprising a set mass of electrically insulating mouldable material, an assembled ring of segments formed at each end with an annular recess, a metal reinforcing ring accommodated by the recess and electrically insulated from said segments and buried in said mass, and at least three U-section spacers of insulating material distributed around each recess and also embedded in said mass and locating said reinforcing rings concentrically in the annular recesses.

2. A commutator as claimed in claim 1, wherein some of the U-section spacers are fitted with their channels directed oppositely to the channels of the others.

3. A commutator as claimed in claim 1, wherein the spacers are fitted with their channels directed axially, the channels of some being directed oppositely to the channels of the others.

4. A commutator as claimed in claim 1, wherein the spacers are fitted with their channels directed radially.

5. A commutator as claimed in claim 1, wherein each spacer is assembled from like stamped laminae.

6. The method of manufacturing a commutator for a rotary dynamo-electric machine of the type in which the conducting segments are held in a basic body consisting of a set mass of electrically insulating mouldable material, the assembled ring of segments being formed at each end with an annular recess accommodating a metal reinforcing ring which is electrically insulated from the segments and buried in the said basic body, said method including the steps of forming unitary insulating elements as spiders of pliable sheet insulating material of assembling the conducting segments into a ring, of placing said insulating elements so that each spider arm crosses said annular recess, locating said reinforcing ring concentrically with said recess, folding said arms into U-section spacers by the co-operation of said reinforcing ring and recess as the ring is inserted into the recess, and separating the spacers of each set from the remaining part of the unitary insulating element.

7. The method as claimed in claim 6, wherein said unitary insulating spiders are so formed as to have the arms joined to a hub and so as to have a localized weak section adjacent to the hub, whereby the arms of each element are separated from its hub at said weak sections as a result of the pressing into the recess of the reinforcing ring with the arms, which last is thereby folded around the ring.

8. The method as claimed in claim 7, wherein the said unitary insulating spiders are formed so that the hub has a central hole and the assembly method includes the step of locating each spider co-axially with the ring of segments by means of its central hole, whereby the arms are folded into said U-section spacers by the co-operation of said reinforcing ring and recess, as the ring is inserted into the recess.

9. The method of manufacturing a commutator for a rotary dynamo-electric machine, as claimed in claim 6, including the additional step of placing moulds against the ends of said assembled ring of segments and against said spacers, so as to locate the reinforcing rings positively in positions intermediate between the moulds faces and the bottoms of the recesses, and injecting the mouldable material into the moulds.

MAX ROKACH.

REFERENCES CITED

The following references are of record in the file of this patent:

UNITED STATES PATENTS

| Number | Name | Date |
|---|---|---|
| 1,909,059 | Kaegi | May 16, 1933 |

FOREIGN PATENTS

| Number | Country | Date |
|---|---|---|
| 834,399 | France | Aug. 16, 1938 |